Dec. 1, 1970       P. V. DOBSON                3,544,127
                    TRUCKS
Filed Nov. 6, 1967                          4 Sheets-Sheet 1
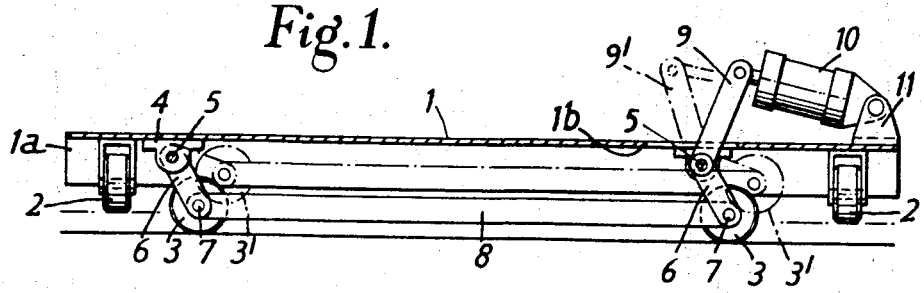
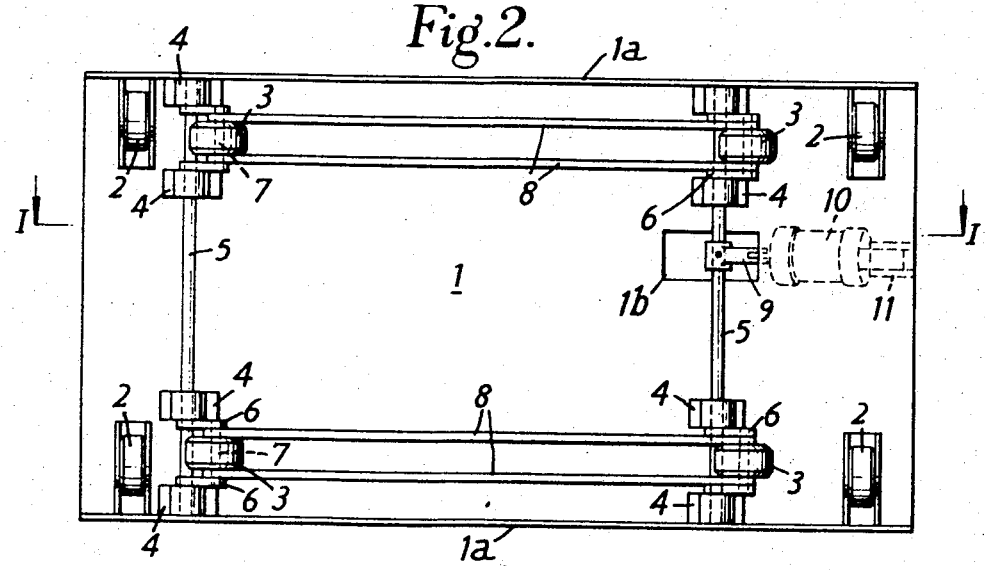
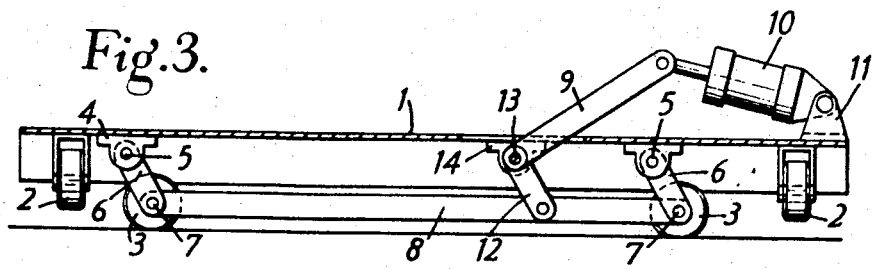

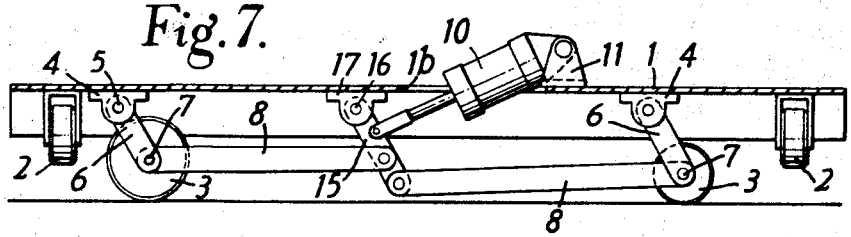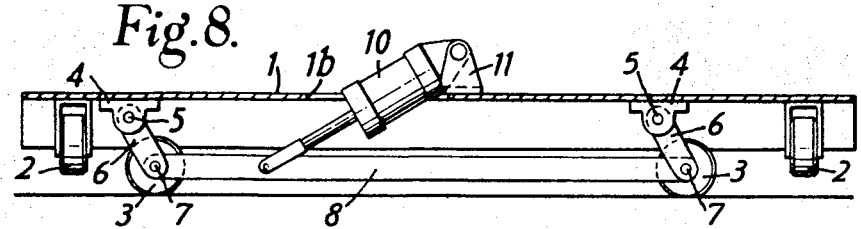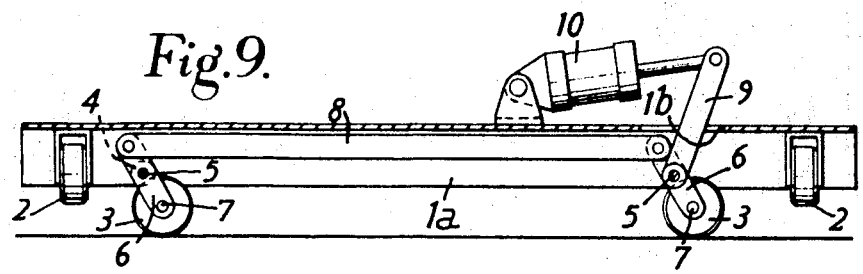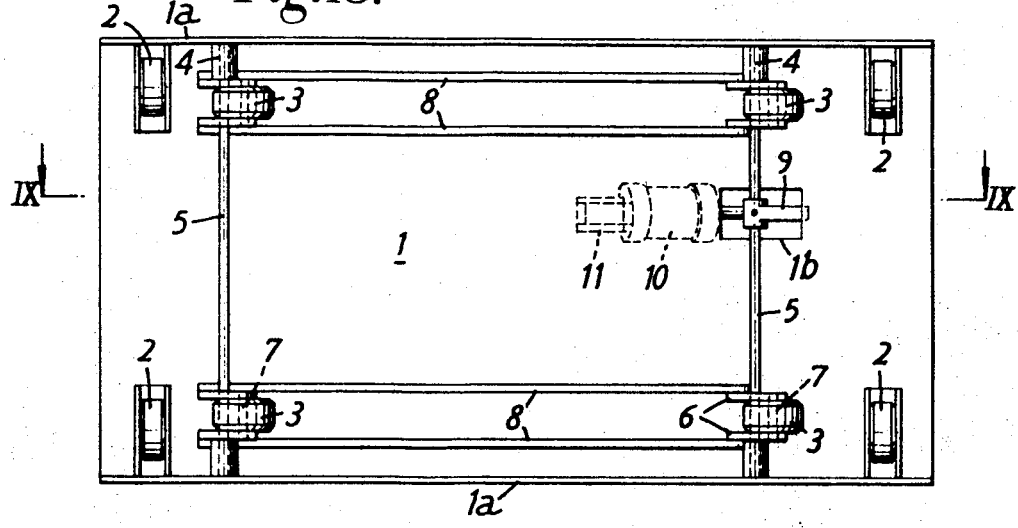

United States Patent Office 3,544,127
Patented Dec. 1, 1970

3,544,127
TRUCKS
Peter V. Dobson, 27 Windsor Walk, South Anston, near Sheffield, Yorkshire, England
Filed Nov. 6, 1967, Ser. No. 680,717
Int. Cl. B62d 21/18
U.S. Cl. 280—43.17      4 Claims

ABSTRACT OF THE DISCLOSURE

A truck comprising a chassis fitted with main wheels and auxiliary wheels disposed at an angle to the latter, the auxiliary wheels being movable up and down so that the main wheels and the auxiliary wheels respectively contact the ground and the truck is movable in two different directions. The auxiliary wheels are carried by sets of wheel arms pivotally mounted on the chassis, the arms of each set being connected together by coupling links so that their wheels are movable up and down in unison. Raising and lowering of the auxiliary wheels is effected by one or more sources of force connected with the sets. Various arrangements of wheel arms and coupling links and various ways of connecting the source(s) of force to them are provided. The truck may be provided with a driving and steering unit.

---

Figure 4:
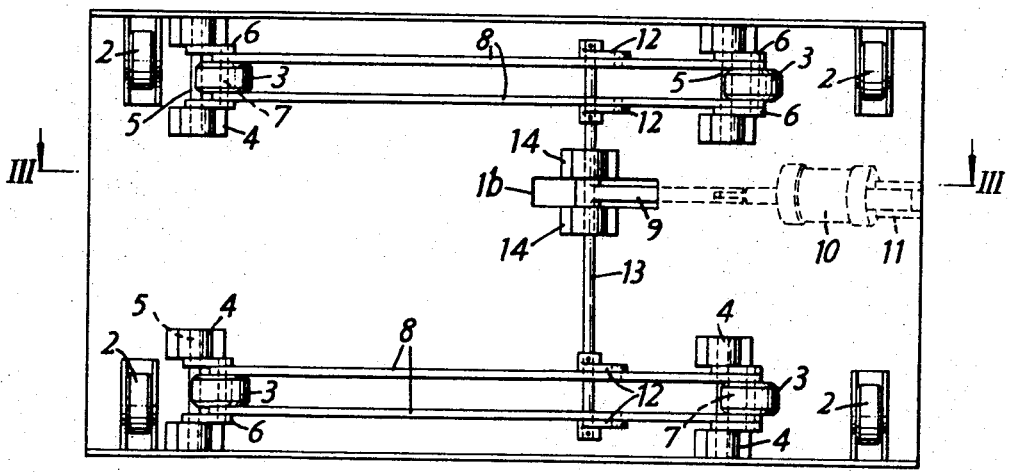

This invention relates to trucks including rail vehicles, i.e., wheeled carriages adapted to be propelled from place to place for the transport of articles, goods or persons carried thereby.

The invention, moreover, is applicable both to a class of truck which is steerable or has one or more swivel wheels and consequently has a conventional turning circle, as well as to a truck of the class furnished with any suitable arrangement of nonsteerable and nonswivelling wheels, and which, by virtue of having no turning cycle, is normally only capable of being propelled along a predetermined straight path.

Included within the trucks to which the invention may be applied are low wheeled carriages, drays, wheeled platforms and skips, fork-lift trucks, side-loading trucks, straddle-legged elevator trucks and conventional road transport vehicles, both goods and passenger types.

Although the invention may be applied to hand-propelled trucks there is no limitation in this respect since, as will be appreciated from above, certain forms of motorised trucks are included within its scope.

The primary object of the present invention is to provide a truck equipped with a simple, readily operable mechanism designed to enable the direction of movement of the truck to be changed, without any changes in the dispositions of the normal wheels of the truck being necessary.

One particular aim of the invention is to enable a truck to move in more than one straight line, for example forwards and backwards and also sideways, suchwise as to achieve economies in space and time.

A further aim is to provide a truck which has driving and steering means and is highly manoeuvrable.

Broadly considered, the chassis of the truck according to the invention, in addition to being fitted with a set of main wheels, has pivotally mounted thereon sets of wheel arms carrying auxiliary ground wheels which are disposed or disposable with their axes at an angle with respect to the axes of the main wheels, each set of wheel arms comprising at least two wheel arms connected together by at least one coupling link so that the auxiliary wheels of the set are movable up and down in unison, and the sets of interconnected wheel arms and coupling links being connected to one or more sources of force which is or are applicable in one direction to swing down all the wheel arms simultaneously and raise the main wheels so that the auxiliary ground wheels are in contact with the ground, whereby a change of direction is imparted to the movement of the truck, and which is or are applicable in the opposite direction to swing up all the wheel arms and raise the auxiliary ground wheels so that the main wheels are in contact with the ground.

A truck according to this invention may have two sets of auxiliary wheel arms which are disposed at opposite sides of the chassis, each set comprising two wheel arms, i.e., two auxiliary wheels. Thus, for example, if the chassis is rectangular in shape, there will be four main wheels disposed at the corners of the chassis with the four auxiliary wheels arranged adjacent to the respective main wheels.

The sets of interconnected wheel arms and coupling links may be operable by a common source of force or by individual sources of force.

In implementing the invention, various arrangements of wheel arms and coupling links and various ways of operating these arrangements by the source or sources of force may be used.

In one arrangement, in which one or more sources of force can be employed, the truck may be fitted with a common spindle which has rigidly secured thereto one wheel arm of each set and which is mounted for turning in spaced bearings fixed to the chassis, and the remaining wheel arms are rigidly secured either to a common spindle or to individual spindles which is or are also mounted for turning in spaced bearings fixed to the chassis.

In another arrangement, also capable of having a single source of force or a plurality of sources of force used, therewith, the wheel arms are each rigidly secured to a short spindle mounted for turning in spaced bearings fitted to the chassis.

As will be appreciated, where a single source of force is used, there must be some connection between the sets of interconnected auxiliary wheel arms and coupling links to enable the auxiliary wheels to be raised and lowered simultaneously by the said source of force. In the first arrangement mentioned above, the said common spindle or one of the said common spindles may constitute such a connection, whereby on turning of the spindle in one or the other direction the wheel arms are swung up or down simultaneously. Alternatively, in this first arrangement an additional spindle may be provided, this spindle being suitably connected to the sets of interconnected wheel arms and coupling links at appropriate locations, whereby on turning of this spindle in one or the other direction the auxiliary wheels are raised or lowered together.

The provision of an additional spindle in this fashion may also be used in the second arrangement mentioned above wherein the sets of wheel arms are mounted independently of one another. Preferably, however, in this second arrangement, individual sources of force are used for the sets of wheel arms and coupling links, i.e., one source of force for each set. In this event, it will be appreicated, that there are no spindles extending between the sets of wheel arms and coupling links so that there is no obstruction.

The auxiliary wheels may all be permanently disposed with their axes at an angle, for example 90°, with respect to the axes of the main wheels, and in this event they will all be arranged to be raised clear of the ground when the main wheels are in contact with the ground. Alternatively, all or certain ones of the auxiliary wheels may be of the swivelling or castor type so that the truck can be moved in any desired direction when the auxiliary wheels are operative. Where certain ones of the auxiliary wheels, at least one of each set, are of the swivelling or castor type and the remaining auxiliary wheels are permanently disposed with their axes at an angle with respect to the axes of the main wheels, the swivelling or castor type wheels may be arranged to be in contact with the ground, not only when the auxiliary wheels are in use, but also when the main wheels are lowered and in contact with the ground. This arrangement enables a steering and drive unit to be provided in association with the swivelling or castor type wheels for steering and driving the truck both when the main wheels are in use and when all the auxiliary wheels are in use.

The source or sources of force may be of various forms. For example, the or each source of force may be a fluid pressure (hydraulic or pneumatic) operated ram, a screw, toggle or lever mechanism, a rack and pinion mechanism, gears and sprockets or an electric motor. In any event, the or each source of force may be arranged to act directly on a connecting spindle extending between the sets of auxiliary wheels as described above, if present, or on a wheel arm or a coupling link.

The invention enables the auxiliary wheels of the respective sets to be made of different diameters; where there is a common source of force, the wheel arms of the respective sets will be appropriately of different lengths, and where there are individual sources of force constituted by fluid pressure operated rams, the strokes of the rams will be appropriately different.

If the truck has a connecting spindle which extends between the sets of auxiliary wheels and is turning on raising and lowering of these wheels, this spindle may be used either to operate additional wheel arms which are mounted independently of the said sets of wheel arms and the auxiliary wheels of which may, if desired, be of different diameters to the wheels of the sets, or to operate any other appropriate mechanism provided on the truck.

Figure 5:
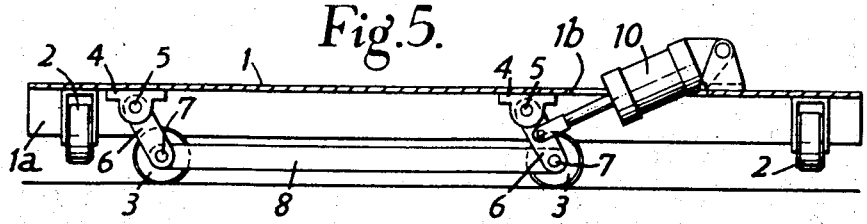
Figure 6:
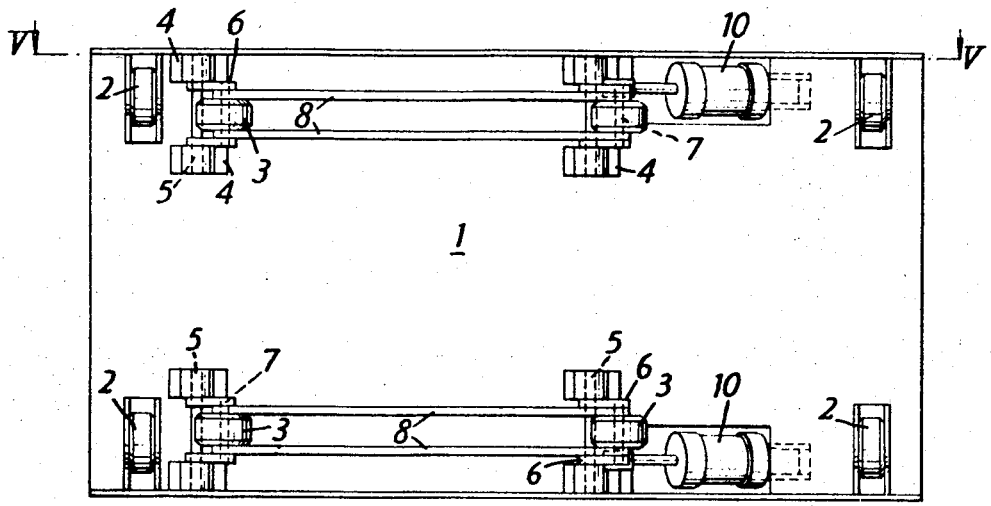
Figure 11:
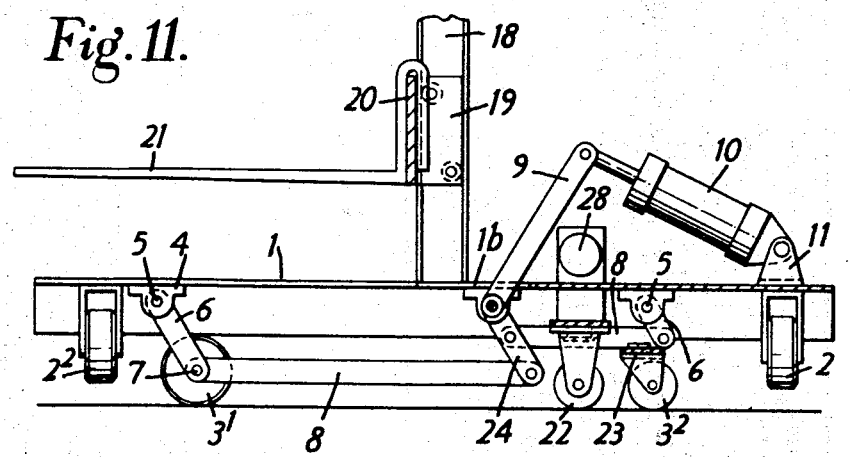
Figure 12:
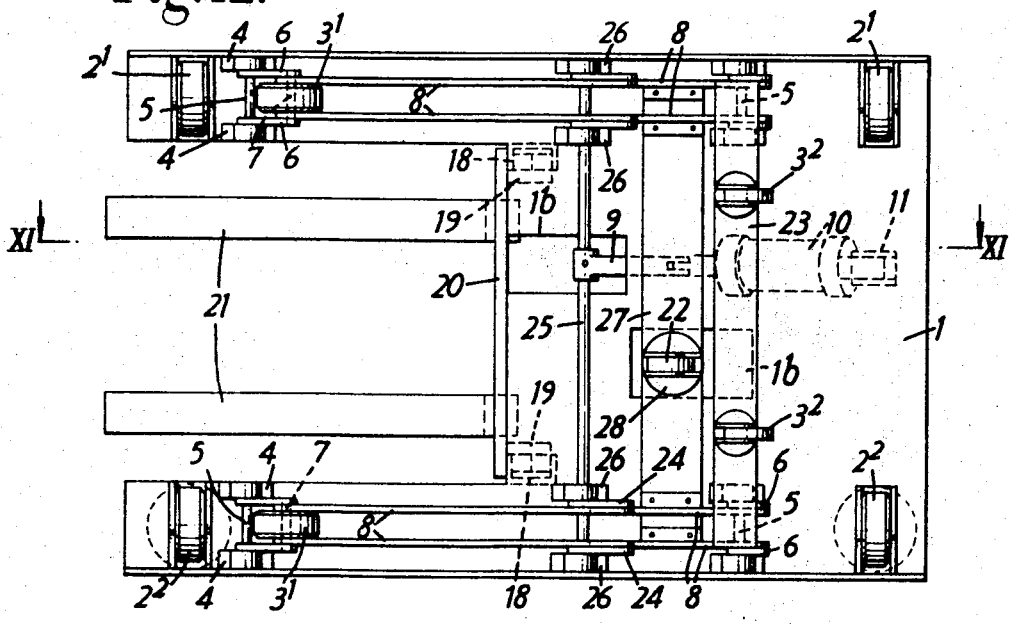
Figure 13:
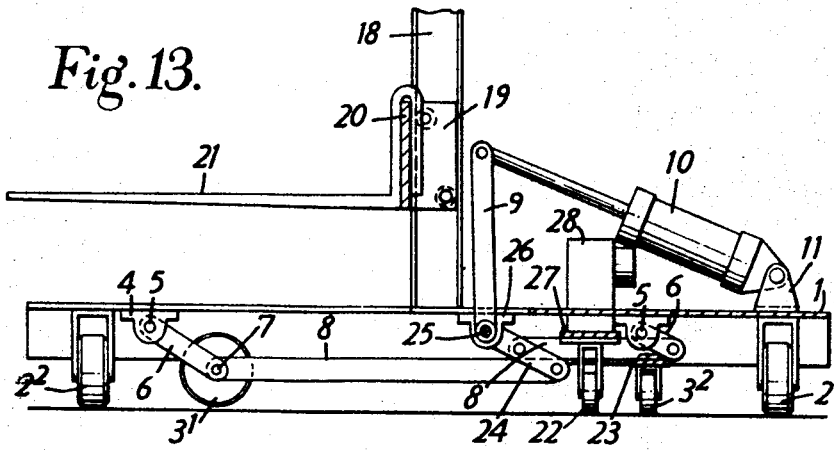

Specific constructional examples of the invention will now be described with reference to the accompanying drawings, in which:

FIG. 1 is a vertical sectional view, taken on the line I—I of FIG. 2, of a simple platform truck having one example of the invention applied thereto, FIG. 2 is an underneath plan view of the truck shown in FIG. 1, FIG. 3 is a vertical section, taken on the line III—III on FIG. 4, through a simple platform truck having another example of the invention applied thereto, FIG. 4 is an underneath plan view of the truck shown in FIG. 3, FIG. 5 is a vertical sectional view, taken on the line V—V of FIG. 6, of a simple platform truck having yet another example of the invention applied thereto, FIG. 6 is an underneath plan view of the truck shown in FIG. 5, FIG. 7 is a vertical sectional view of a simple platform truck equipped with a further example of the invention, FIG. 8 is a vertical sectional view of a simple platform truck having yet a further example of the invention applied thereto, FIG. 9 is a vertical section, taken on the line IX—IX of FIG. 10, through a simple platform truck having another example of the invention applied thereto, FIG. 10 is an underneath plan view of the truck illustrated in FIG. 9, FIG. 11 is a vertical section, taken on the line XI—XI of FIG. 12, through a fork lift truck furnished with another example of the invention, showing the main wheels thereof raised to their inoperative positions, FIG. 12 is an underneath plan view of the truck shown in FIG. 11, and FIG. 13 is a view similar to that of FIG. 11, showing the main wheels lowered to their operative positions.

Like parts are designated by similar reference characters throughout the drawings.

The simple platform truck diagrammatically illustrated in FIGS. 1 to 10 each comprises a rectangular platform 1 having at opposite sides thereof depending side plates 1a. Bolted to the truck chassis, i.e., the platform 1, adjacent the corners thereof are forklike brackets carrying four main ground wheels 2 rotatable about fixed axes. Each truck is furnished with a set of four auxiliary ground wheels 3 which are rotatable about fixed axes disposed at right angles to the axes of the main wheels 2 and which are movable between a raised position in which they are clear of the ground and the truck is supported by the main wheels, and a lowered position in which the main wheels are clear of the ground and the truck is supported by the auxiliary wheels. Thus, each truck can travel forwards and backwards in the first-mentioned position and sideways in the second position.

Referring now to the example of the invention illustrated in FIGS. 1 and 2, the truck chassis has secured to its underside adjacent its respective ends two sets of bearings 4, each set comprising two aligned pairs of bearings arranged at opposite sides of the chassis. Mounted for turning in each set of bearings is a spindle 5 which extends right across the chassis and has rigidly secured thereupon, adjacent the respective pairs of bearings, two pairs of radial wheel arms 6, the lower ends of each pair carrying an axle 7 on which an auxiliary ground wheel 3 is rotatably mounted. It will be seen that each auxiliary ground wheel is arranged between its two wheel arms and the latter are arranged between the associated pair of bearings 4 which are suitably spaced apart. The two pairs of wheel arms 6 at each side of the chassis are connected together by two parallel coupling links 8 which are pivotable relatively to the respective pairs of wheel arms and through which the axles 7 pass, so that the spindles 5 and the wheel arms are movable in unison.

One of the spindles 5 has rigidly secured thereto a radial arm 9 which extends through an opening 1b in the platform 1 and is pivotally connected to the piston rod of a hydraulic or pneumatic piston/cylinder unit 10 above the platform. This unit 10 is pivotally mounted on a support bracket 11 carried by the platform, and the fluid pressure for operating the unit is obtained from a conventional pump or compressor (not shown) mounted on the truck, its control being effected in a known manner by suitable manually operable valves or valves operable by an electrical control circuit.

Thus, the arrangement is such that whenever the piston rod is projected from the unit 10, the arm 9 moves to the position shown at 9′ and thereby turns the spindle 5 to which it is connected, through a specific angular distance. The associated wheel arms 6, and with them the other wheel arms 6 coupled thereto by the links 8, are accordingly swung up so that the auxiliary wheels are raised to an inoperative position 3′ clear of the ground. The support of the truck on the ground is therefore taken over by the main ground wheels 2 as shown in dot dash lines in FIG. 1.

When the piston rod is returned to its retracted position in the unit 10, the auxiliary wheels 3 are lowered to an operative position, whereby the main wheels 2 are raised so that the support of the truck is taken over by the auxiliary wheels are shown in full lines in FIG. 1.

In the example illustrated in FIGS. 3 and 4, each pair of the bearings 4 carries a short spindle 5 to which are rigidly secured the two wheel arms 6 carrying the associated auxiliary wheel 3. Each pair of coupling links 8 connecting together the pairs of wheel arms has pivotally coupled thereto two arms 12, and the two pairs of arms 12 are rigidly attached to opposite ends of an additional connecting spindle 13 extending transversely of the chassis and turnable in bearings 14 secured to the underside of the latter. Also rigidly connected to the spindle 13 between the spaced bearings 14 is the radial arm 9 coupled to the piston/cylinder unit 10.

In this case raising and lowering of the auxiliary ground wheels 3 is effected by turning the spindle 13 and, through the arms 12, actuating the coupling links 8. It is to be noted that in this arrangement the unit 10 and the arm 9 can conveniently be located at any position along the spindle 13.

In each of the examples of FIGS. 5 to 8 raising and lowering of the two interconnected pairs of auxiliary wheels 3 is effected by individual piston/cylinder units 10 operable in unison. In each case each pair of wheel arms 6 is carried by a short spindle 7 mounted in a pair of the bearings 4.

Referring to FIGS. 5 and 6, the piston rod of each unit 10 is pivotally connected to one of the wheel arms 6 of one of the two pairs of wheel arms concerned so that the unit acts to swing all the said wheel arms up and down in unison.

In FIG. 7 each pair of wheel arms has pivotally connected thereto two coupling links 8, and the two pairs of links 8 at each side of the chassis are articulated to a common pair of spaced, parallel arms 15 which are rigidly secured to a short spindle 16 mounted in a pair of spaced bearings 17 on the underside of the platform 1. One or both of the two arms 15 of each pair has pivotally connected thereto the piston rod of the associated piston/cylinder unit 10 which acts to raise and lower the two interconnected auxiliary wheels together.

As will be seen, this arrangement has the advantage that one set of auxiliary wheels can be made of a larger diameter than the other set, the coupling links 8 of the larger auxiliary wheels being pivotally connected to the arms 15 at points located above the corresponding pivot points of the links 8 of the smaller auxiliary wheels.

It is to be noted that the arrangement of FIG. 7 may be used where raising and lowering of the two pairs of auxiliary wheels is required to be effected by a single piston/cylinder unit. In this event, there may be provided instead of the two short spindles 16, a long spindle which extends right across the chassis and has the piston rod of the unit connected therewith as in the arrangement of FIGS. 3 and 4.

Turning now to FIG. 8, in this example the piston rod of each piston/cylinder unit 10 is articulated directly to one of the two coupling links 8 of the interconnected pair of auxiliary wheels 3 concerned.

FIGS. 9 and 10 show yet another example of the invention in which the auxilary wheels 3 are operable by a single piston/cylinder unit 10, but with a different arrangement of wheel arms. The two wheel arms 6 at each end of the chassis are rigidly secured at their centres to a transverse spindle 5 which is turnable in bearings 4 mounted on the side plate 1a of the platform 1. The two pairs of wheel arms at each side of the chassis are coupled together at their upper ends by two coupling links 8, and each pair carries at their lower ends an axle 7 carrying an auxiliary wheel 3. One of the sindles 5 has rigidly attached thereto a radial arm 9 articulated to the piston rod of the piston/cylinder unit 10. Turning of this spindle by the unit in one direction or the other accordingly swings all the wheel arms 6 about their centres to raise or lower the auxiliary wheels.

In all the above described examples, some at least of the auxiliary wheels may be in the form of swivel castors and/or have associated therewith a steering and/or driving mechanism.

Finally, a sophisticated example of the invention applied to a fork lift truck is illustrated in FIGS. 11 to 13. This truck comprises a U-form platform 1 constituting the chassis and guideway comprising two vertical channel members 18 in which run rollers carried by plates 19; these two plates are connected together by a cross member 20 which carries two horizontal arms 21. These arms are vertically movable by conventional hydraulic means (not shown). In operation, the arms 21 are inserted in their lowered position, beneath the load to be transported and are then raised to lift the load. The truck is then driven (see below) to the place where the load is to be deposited.

The truck chassis is furnished with four main wheels; two of these wheels, denoted $2^1$ and disposed at one side of the chassis, are rotatable about fixed axes and the other two wheels, denoted $2^2$ and located at the other side, are constituted by the wheels of swivel castors. The chassis is also provided with a set of auxiliary ground wheels two of which, i.e., those denoted $3^1$ at the front end of the chassis, are comparatively large in diameter and rotatable about fixed axes disposed at right angles to the axes of the fixed main wheels and two of which, i.e., those denoted $3^2$ at the rear end, are smaller in diameter and are constituted by the wheels of swivel castors. A steering and driving wheel 22 is provided for driving and steering the truck. In this arrangement, when the main wheels $2^1$ and $2^2$ are operative, only the front auxiliary wheels $3^1$ are raised clear of the ground, the auxiliary castor wheels $3^2$ and the driving wheel 22 being in contact with the ground, so that the truck can be driven generally sideways but with a certain amount of steering capacity, and when the main wheels are inoperative, all the auxiliary wheels and also the steering and driving wheel are in contact with the ground, so that the truck can be driven generally forwards and backwards but with a certain amount of steering capacity. Thus, the truck can be driven and also steered to a certain extent both when the main wheels are operative and when the auxiliary wheels are operative, this making the truck highly manoeuvrable.

The two front auxiliary wheels $3^1$ are carried by axles 7 mounted in two pairs of wheel arms 6 which are rigidly secured to short spindles 5 turnable in pairs of bearings 4 on the underside of the chassis.

The swivel castors carrying the auxiliary castor wheels $3^2$ are shown diagrammatically and are of a conventional form, i.e., each comprises a fork carrying an axle on which the wheel is rotatable, and mounted for turning on a fixed component. The fixed components of the castors are secured to the underside of a transverse plate 23 which which is carried by two pairs of links 8 located at opposite sides of the chassis. These pairs of links 8 are articulated at their rear ends to two pairs of wheel arms 6 secured to short spindles 5 turnable in pairs of bearings 4 on the underside of the chasis, and at their front ends to two further pairs of arms 24 which are rigidly secured to a common tranverse spindle 25 turnable in pairs of bearings 26 mounted on the underside of the chassis. The pairs of arms 24 are connected by pairs of coupling links 8 to the front wheel arms 6.

The transverse spindle 25 has rigidly secured thereto a radial arm 9 which extends through an opening 1b in the platform and is articulated to the piston rod of a pneumatic or hydraulic piston/cylinder unit 10 pivotally mounted on a bracket 11 fixed to the platform 1.

Thus, turning of the spindle 25 by the unit 10 (the latter being operable by fluid pressure supplied by a conventional pump or compressor on the truck) in one or the other direction causes the assembly of links and arms carrying the four auxiliary wheels $3^1$ and $3^2$ to be raised and lowered. It should be noted that the locations of the various pivot points of the links 8 and wheel arms 6 and the diameters of the main and auxiliary wheels have to be carefully calculated in order that the auxiliary castor wheels $3^2$ are in contact with the ground when the main wheels are both inoperative and operative and the front auxiliary wheels $3^1$ are clear of the ground only when the main wheels are operative.

The rear links 8 carrying the transverse plate 23 also have attached thereto a transverse member 27 which supports a steering and drive unit 28 for the wheel 22. This wheel is rotatable on an axle mounted between the legs of a fork and the latter is mounted for turning on the unit 28. The unit is of a conventional form and has steering connections coupled to the fork for the purpose of turning the latter to steer the truck, and drive connections from a motor coupled to the wheel for the purpose of rotating the latter to drive the truck. The steering and drive connections are not shown in the interests of clarity and also because they are conventional. It will be seen that as the steering and drive wheel 22 is carried by the same structure as the auxiliary castor wheels $3^2$, it will always be in contact with the ground. The wheel can, therefore, be used for both driving and steering when the main wheels are operative and also when the front auxiliary wheels $3^1$ are operative.

The steering and drive unit may be spring mounted so that it can compensate for irregularities in the ground.

I claim:

1. A truck comprising a chassis; a set of main wheels fitted to the chassis; a spindle mounted in spaced bearings located on said chassis; a plurality of sets of wheel arms pivotally mounted on the chassis, the pivot axes thereof being substantially parallel to the axis of said spindle; a plurality of auxiliary ground wheels which are carried by the wheel arms and are disposed with the axes of said auxiliary wheels at an angle with respect to the axes of the main wheels; each of said plurality of sets comprising at least two wheel arms arranged parallel to one another, a further arm rigidly secured to said spindle and disposed parallel to the wheel arms of the set, and separate coupling links at different elevations for connecting said further arm to the respective wheel arms of the set to form first and second parallelogram-form linkages so that the wheel arms and the coupling links are movable in a parallel motion to raise and lower the auxiliary wheels of the set in unison and to effect a differential in the rate of vertical displacement of the respective auxiliary wheels; and a single source of force connected to said spindle for turning the latter and for producing, upon application of a force in one direction, swinging down of all the wheel arms simultaneously and raising of the main wheels so that the auxiliary ground wheels are in contact with the ground such that a change of direction is imparted to the movement of the truck, and for producing, upon application of a force in the opposite direction, swinging up of all the wheel arms and raising of the auxiliary ground wheels so that the main wheels are in contact with the ground.

2. A truck according to claim 1, wherein the auxiliary wheels are of different sizes.

3. A truck according to claim 1, wherein at least one wheel of each set of auxiliary wheels comprises a swivelling or castor type wheel and the remaining auxiliary wheels are disposed with the axes thereof at an angle with respect to the axes of the main wheels, said swivelling or castor type wheels being in contact with the ground not only when the auxiliary wheels are in use, but also when the main wheels are lowered and in contact with the ground.

4. A truck according to claim 1, wherein at least one wheel of each set of auxiliary wheels comprises a swivelling of castor type wheel and the remaining auxiliary wheels are disposed with the axes thereof at an angle with respect to the axes of the main wheels, said swivelling or castor type wheels being in contact with the ground not only when the auxiliary wheels are in use, but also when the main wheels are lowered and in contact with the ground, said truck further comprising coupling links between the swivelling or castor type auxiliary wheels and a radial arm for carrying a steering and drive unit, said unit being movable up and down with the said coupling links and comprising means for steering and driving the truck both when the main wheels are in use and when all the auxiliary wheels are in use.

References Cited

UNITED STATES PATENTS

| | | | |
|---|---|---|---|
| 2,996,307 | 8/1961 | Debailleux | 280—43.17 |
| 3,269,744 | 8/1966 | Dobson | 280—43.23 |
| 3,287,024 | 11/1966 | Ulinski | 280—43.12 |
| 3,410,569 | 11/1968 | Blake | 280—43.23 |

LEO FRIAGLIA, Primary Examiner

R. R. SONG, Assistant Examiner

U.S. Cl. X.R.

280—43.23